United States Patent [19]

Fasulo, II et al.

[11] Patent Number: 5,539,772
[45] Date of Patent: Jul. 23, 1996

[54] APPARATUS AND METHOD FOR VERIFYING PERFORMANCE OF RF RECEIVER

[75] Inventors: Albert J. Fasulo, II, Ellicott C; Anthony D. Haines, Hampstead, both of Md.

[73] Assignee: Westinghouse Electric Corporation, Pittsburgh, Pa.

[21] Appl. No.: 322,856

[22] Filed: Oct. 13, 1994

[51] Int. Cl.$^6$ ............................ H04B 17/00; G06F 11/00
[52] U.S. Cl. .................................................. 375/224
[58] Field of Search ................... 375/10, 296, 298, 375/227, 213, 214; 371/23; 364/578

[56] References Cited

U.S. PATENT DOCUMENTS

| | | | |
|---|---|---|---|
| 4,143,322 | 3/1979 | Shimamura | 325/320 |
| 4,318,049 | 3/1982 | Mogenson | 329/50 |
| 4,466,108 | 8/1984 | Rhodes | 375/83 |
| 4,787,096 | 11/1988 | Wong | 375/120 |
| 4,879,728 | 11/1989 | Tarallo | 375/80 |
| 5,233,628 | 8/1993 | Rappaport et al. | 375/224 |

OTHER PUBLICATIONS

Connelly, "Design of the Westinghouse Series 1000 Mobile Phone." IEEE, pp. 347–350, May 18, 1993.
Connelly, "The Westinghouse Series 1000 Mobile Phone: Technology and Applications," IEEE, pp. 375–379, May 18, 1993.

*Primary Examiner*—Stephen Chin
*Assistant Examiner*—Kevin Kim

[57] ABSTRACT

Apparatus to test both the analog and digital portions of a mobile receiver, which includes simulating signals received from a satellite with interferences and impairments.

30 Claims, 15 Drawing Sheets

APPARATUS AND METHOD FOR VERIFYING PERFORMANCE OF RF RECEIVER

BACKGROUND OF THE INVENTION

1. Field of Invention

The present invention relates to an apparatus and method for testing the performance of an RF receiver; and more particularly, an apparatus and method for verifying the performance of a digital receiver.

While the invention is subject to a wide range of applications, it is especially suited for testing the performance of a mobile terminal for digital satellite communication having a quadrature phase shift keyed digital receiver capable of receiving voice and data transmissions, and is described in that connection.

2. Description of Related Art

In a typical satellite communication system, incoming signals from a conventional wired telephone are conducted from the public switch telephone network to a satellite ground station, which in turn transmits RF signals to the satellite for retransmission to a mobile terminal unit. Presently, a satellite system that covers large geographical areas typically uses several satellites that follow different paths at low or medium altitudes so that at least one satellite is at all times covering the desired geographical area. From the standpoint of receiving signals, the low and medium altitude satellites have the advantage of being able to transmit a signal that reaches a mobile terminal unit at the earth's surface with a relatively large amplitude and without appreciable fading. It has been proposed, however, to provide a satellite communications network that utilizes a high altitude geosynchronous satellite which is capable of covering an area corresponding to a substantial portion of the North American Continent, so that a total of approximately six satellite beams will cover the entire Continent from Alaska to Mexico. The satellite for such a network will be approximately 22,600 miles above the equator and will be designed to operate in the L-band of RF frequencies. Energy traveling this great distance undergoes huge attenuation such that the power flux density incident at the antenna of the mobile unit is approximately $10_{14}$ watts per square meter. This grossly attenuated signal is further degraded by background noise, and other satellite channel impairments such as Rician Fading, gaussian noise, phase noise, and co-channel and adjacent channel interference.

Mobile terminal units capable of receiving these highly attenuated and impaired signals have been developed. One type of such mobile terminal includes a satellite receiver that has analog, digital and software subsections. In order to ensure that these receivers are capable of working as intended, it is of course necessary to test them under various operating conditions prior to leaving the factory. The effectiveness of the receiver should be able to be determined by merely receiving a communication over the satellite system, listening to the telephone handset, receiving a fax from the fax machine, or displaying an input from a personal computer connected to the mobile terminal. However, in order to provide defect-free mobile terminals it is necessary to test the receiving portions of such terminals under all atmospheric conditions to which the satellite system would encounter. Although, the receivers could be tested at times by using signals in the actual operating environment, it is practically impossible to subject each receiver to all of the interferences and impairments of the actual operating conditions.

In light of the foregoing, there is a need for an apparatus and method of verifying the performance of a satellite digital receiver in response to signals that are subject to all of the possible interferences and impairments of a satellite system in actual operation.

SUMMARY OF THE INVENTION

Accordingly, the present invention is directed to an apparatus and method for verifying the performance of a digital satellite receiver that substantially obviates one or more of the problems due to limitations and disadvantages of the related art.

One of the advantages of the present invention is its ability to verify the performance of a digital satellite receiver over the entire spectrum of its operation, and under conditions of signal impairments and interferences, and yet is relatively inexpensive to manufacture.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims as well as the appended drawings.

To achieve these and other advantages and in accordance with the purpose of the invention as embodied and broadly described, the invention is an apparatus for verifying performance of an RF receiver that includes a waveform generator for outputting an analog in phase waveform and a quadrature phase waveform in response to the generation of sampled waveform data, the generator including two parallel first in first out (FIFO) memories for storing sampled digital waveform data. An in phase (I) waveform digital file of sampled waveform data is stored in one memory, and a quadrature phase (Q) digital waveform file of sampled waveform data is stored in the other memory. Each (I) and (Q) waveform file includes frames of primary transmission channel data mixed with one or more of the interferences of a group consisting of co-channel interference data, adjacent channel interference data, and data related to one or more of the impairments of a group of impairments. A unity gain reconstruction filter is connected to an output of the waveform generator operative to smooth each (I) and (Q) analog waveform. A vector signal generator, responsive to the filtered (I) and (Q) waveforms, outputs a modulated RF signal distorted by one or more of the interferences and one or more of the impairments. An output of the vector signal generator is coupled to an RF input of the receiver whose performance is being verified.

In another aspect, the present invention is a method of verifying the performance of a satellite digital receiver including generating an information file stream of ones and zeros representing digital information of the type input to a digital portion of a ground segment for processing and transmitting to a mobile transceiver via a satellite; transforming the information file stream into satellite frame format of encoded data; separating the encoded framed data into (I) and (Q) data streams which are root-cosine filtered to produce two sampled signal waveform files; summing digitally calibrated simulated channel impairments with the (I) and (Q) filtered waveforms; scaling the summed (I) and (Q) samples from a floating point representation to a fixed point representation; downloading the fixed point (I) and (Q)

waveform files into two parallel real time FIFO memories of an arbitrary waveform generator to produce an analog output of each (I) and (Q) waveform; combining the (I) and (Q) waveforms in a vector modulator to produce an RF digital quadrature phase shift keyed signal output; applying the output signal of the vector modulator to an analog subsection of the digital receiver; activating the digital receiver to provide an output, and monitoring the receiver output.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention, and together with the description serve to explain the principals of the invention.

DESCRIPTION OF THE PREFERRED EMBODIMENT

Figure 1:
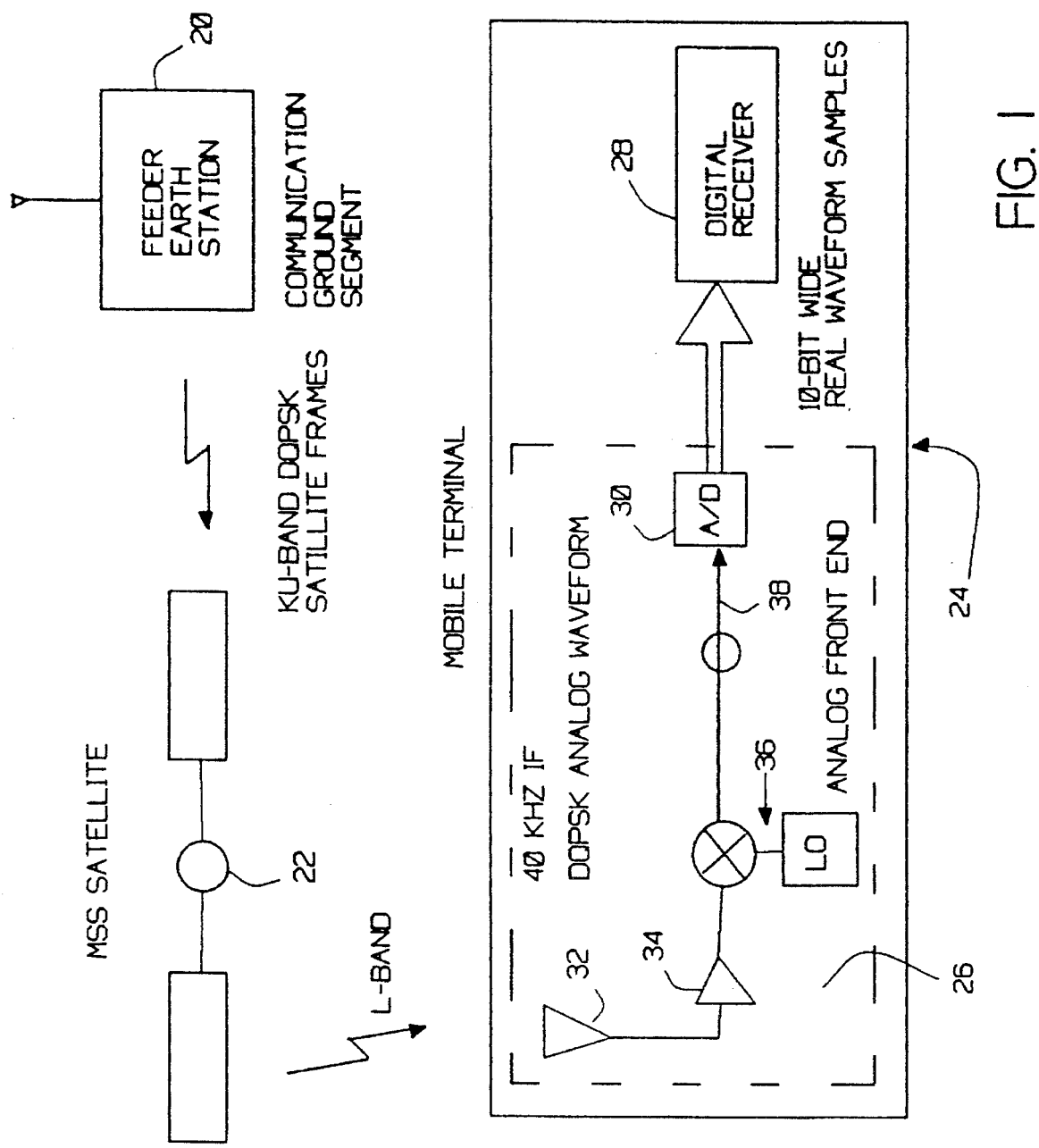
FIG. 1 is a schematic block diagram of a satellite communication system with which the receiver is intended to operate.

Prior to describing the details of the preferred embodiment of the present invention, reference is made to FIG. 1, in which the signals received by a mobile terminal 24 are generated at a communication ground segment or feeder earth station 20 and transmitted to a satellite 22 in the form of Ku-band differential quadrature phase shift keyed (DQPSK) satellite frames. The satellite 22 in turn transmits the satellite frames over the L-band to mobile terminal 24. The mobile terminal 24 has an RF analog section 26 and a digital receiver section 28. The digital receiver section 28 is coupled to the RF section 26 by an analog to digital converter 30. The receiver 24 receives signals from the satellite 22 via an antenna 32. The signal from the antenna 32 goes through a low noise amplifier 34, the output of which is down-converted at 36 to provide a DQPSK analog waveform on line 38 input to the A/D converter 30. The converter 30 transforms the analog waveform to 10-bit wide real waveform samples that are processed by the digital receiver 28.

Figure 2:
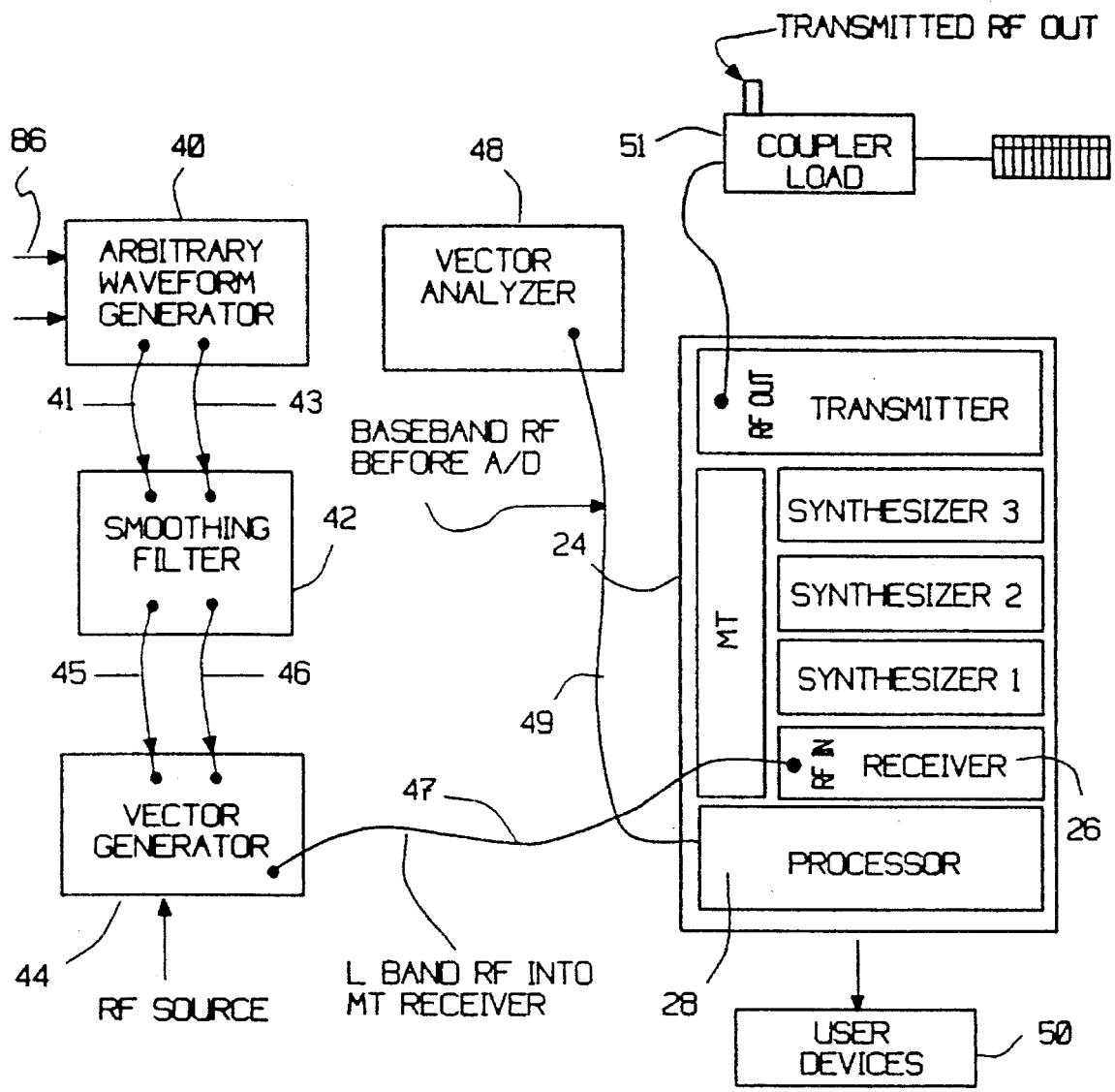
FIG. 2 is a schematic drawing of the various components and their arrangement that constitute the apparatus of the present invention.

Apparatus of the present invention for verifying performance of an RF receiver, as embodied in FIG. 2, comprises a waveform generator 40 having an (I) in-phase waveform file and a (Q) quadrature phase waveform file of sampled waveform data stored in respective parallel first in-first out memories. A smoothing filter 42 having (I) and (Q) inputs is connected to corresponding outputs of the generator 40 over lines 41 and 43 respectively. A vector generator 44 having (I) and (Q) inputs is connected to corresponding outputs of the smoothing filter 42 over lines 45 and 46. The vector generator 44 has an RF output for connection to the analog RF portion 26 of the mobile terminal 24 over line 47. A vector analyzer 48 has an input 49 connected to the analog input of the digital processor of the receiver 28. The mobile terminal has user devices referred to collectively at 50, which are used to detect the performance of the receiver. The actual listening of the incoming signals verifies voice reception. The actual production of a FAX document in response to the output of the vector generator tests the FAX reception. A personal computer having an RS 232 input connected to the mobile terminal is tested by comparing the digital train of the ones and zeros with the trains of ones and zeros of the original text file. An artificial load 51 is connected to the output of the transmitter portion of the unit 24 because the transmitter turns on periodically when there is an interruption in voice reception.

The generator 40 is preferably an arbitrary waveform generator of the type manufactured by Tektronix Model No.AWG2020. The smoothing filter 42 is preferably a unity gain reconstruction filter (4th Order Bessel) manufactured by Westinghouse Electric Corporation. The vector generator 44 is a vector modulator preferably of the type manufactured by Hewlett-Packard and known as Model No. 8780A.

The in-phase (I) and quadrature phase (Q) data files loaded in the two parallel first in, first out memories of the waveform generator 40 are a digital representation of a 60% root cosine filtered differential quadrature phase shift keyed (DQPSK) waveform formed in the feeder earth station or communication ground segment 20. The (I) and (Q) output files on line 86 (see FIG. 3) represent intermediate outputs in the DQPSK modulation chain of base band digitally sampled waveform files.

The method of the present invention comprises three stages. In the first stage, the waveforms for the main and interference channels are formed into an encoded, framed ASCII data file stream of ones and zeros that emulate framed encoded signals produced in the digital portion of the ground segment.

Figure 3A:
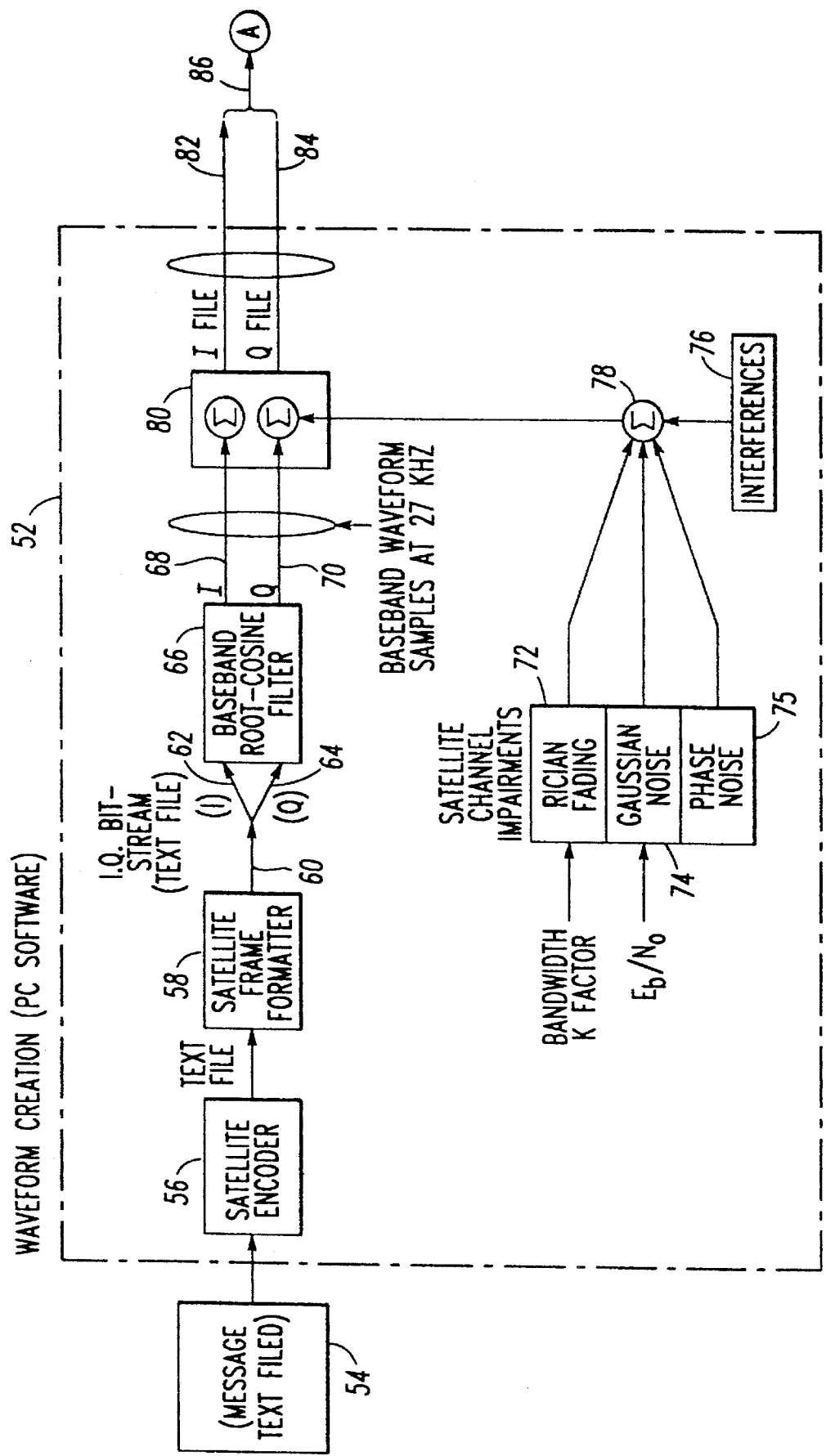
FIGS. 3A and 3B are schematic flow charts and diagrams illustrating the creation of the waveform and the playback of the real time waveform for testing the receiver in accordance with the present invention.

As herein embodied and referring to FIG. 3A, the schematic block diagram within dashed lines 52 is a flowchart illustrating the creation of the waveform, which is preferably implemented in Turbo C software. A message text file at block 54 is a stored ASCII information file stream of ones and zeros that would ordinarily be introduced at the beginning of the digital portion of the transmitter of the ground segment 20 (FIG. 1) for processing and transmission to the mobile terminal 24 via the satellite 22. The stored ASCII file stream is then output to a satellite encoder 56 and a satellite frame formatter 58 to provide an output on line 60 that corresponds to an encoded, framed ASCII data file stream of ones and zeros that represents framed, encoded data as it would be produced at the ground segment or feeder earth station 20 end of the satellite communication link.

In creating the waveform, the encoded framed data, consisting of ones and zeros, is separated into odd bits and even bits on lines 62 and 64 respectively at the input to a base band root-cosine filter 66. The filter 66 produces the root cosine filtered (I) and (Q) base band digitally-sampled waveform files on lines 68 and 70.

In accordance with the invention, calibrated satellite channel impairments are digitally summed with the unimpaired (I) and (Q) filtered waveforms. The (I) and (Q) samples with the digitally summed impairments are scaled from a floating point PC representation to a 12-bit fixed point representation for acceptance by the 12-bit (I) and (Q) first in, first out memories located in the arbitrary waveform generator.

As herein embodied, selected satellite channel impairments, such as Rician Fading, represented at block 72, gaussian noise represented at block 74, phase noise represented at block 75 and interferers represented by block 76 are output either singly or in selected combinations to a summing device 78 where they are digitally added to both the (I) and (Q) base band waveform samples at the summing devices of block 80. The block 80 generates an (I) and a (Q) file on lines 82 and 84 respectively that are impaired in accordance with the output of the summing device 78. Thus, the waveform samples on lines 82 and 84 are 60% root-cosined filtered base band waveform samples formed at a rate of 27 kHz. The waveform samples are then in a 12-bit fixed point format to be fed out at a rate of 27 kHz to the digital to analog converters 92 and 94 respectively.

Figure 3B:
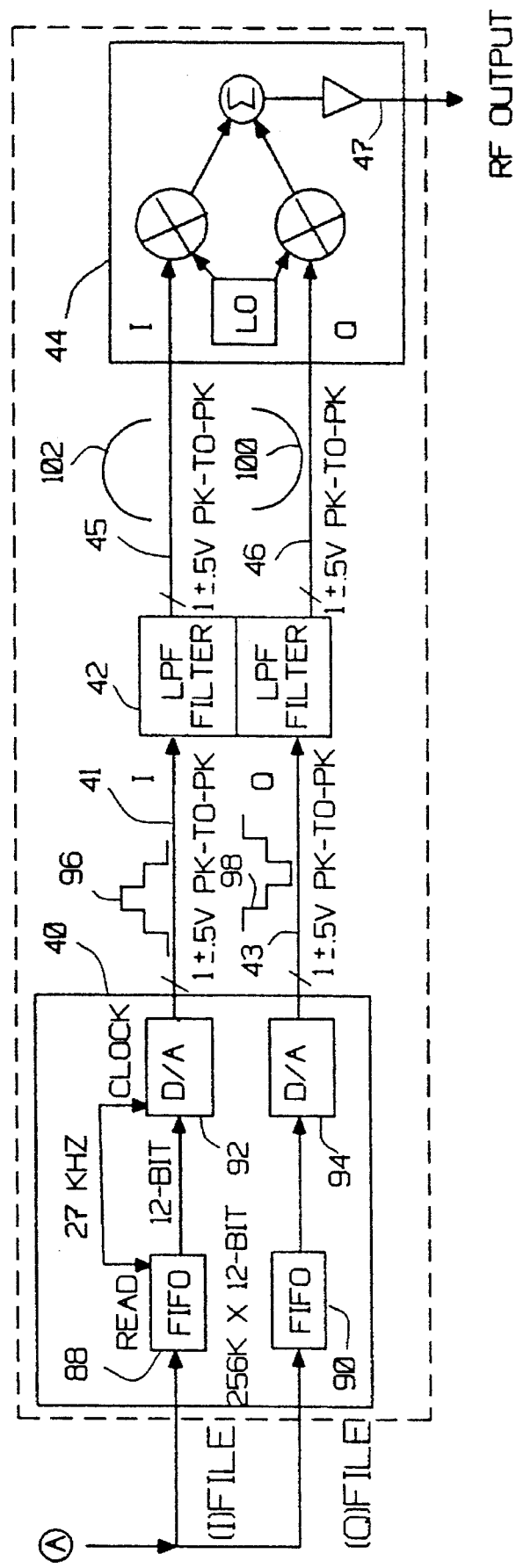

In the second stage of the process the completed created (I) and (Q) waveform files are downloaded into the two parallel real time playback first in, first out random access memories located in the arbitrary waveform generator. The file download may be via disk or the conventional 488 bus. Each of the arbitrary waveform generator random access memories may store up to 256 k 12-bit words or waveform samples. Referring to FIG. 3B, the waveform samples on lines 82 and 84 are downloaded over line 86 to the input of the arbitrary waveform generator 40. The (I) file is input to a first in, first out memory 88, and the (Q) file is input to a similar memory 90.

During the third stage of the method of the present invention, the (DQPSK) modulation chain is completed using the stored (I) and (Q) files and the arbitrary waveform generator, a smoothing filter 42, and a vector modulator 44 in real time to produce the final RF DQPSK signal output. The (I) and (Q) waveform samples are read out of the arbitrary waveform generator, i.e., read from the random access memories and converted in the digital to analog converters at a sample rate of 27 kHz. The resulting quantized (I) and (Q) analog waveform outputs are smoothed, and the resulting smoothed base band (I) and (Q) waveforms are used to drive the vector modulation inputs of a vector modulator. The vector modulator 94 outputs a stable calibrated phase modulated RF signal, at the desired output signal amplitude level and frequency. This RF output may be connected to the receiver at any point after the antenna receive output. The (I) and (Q) files are output in analog format on the lines 41 and 43. The general shape of the analog waveform for the (I) file is shown at 96, and the general form of the analog waveform of the (Q) file is represented by waveform 98. The stepped analog waveforms 96 and 98 are then filtered by the low pass filter 42 previously described to output on the lines 45 and 46 a waveform having a smooth configuration as shown by the curved lines 100 and 102. The analog waveforms corresponding to the (I) and (Q) file are then applied to the vector signal generator 44 to provide a calibrated RF output on the line 47. This calibrated output is then connected to the receiver, preferably at the input to the low noise amplifier 34 (FIG. 1).

Figure 4:
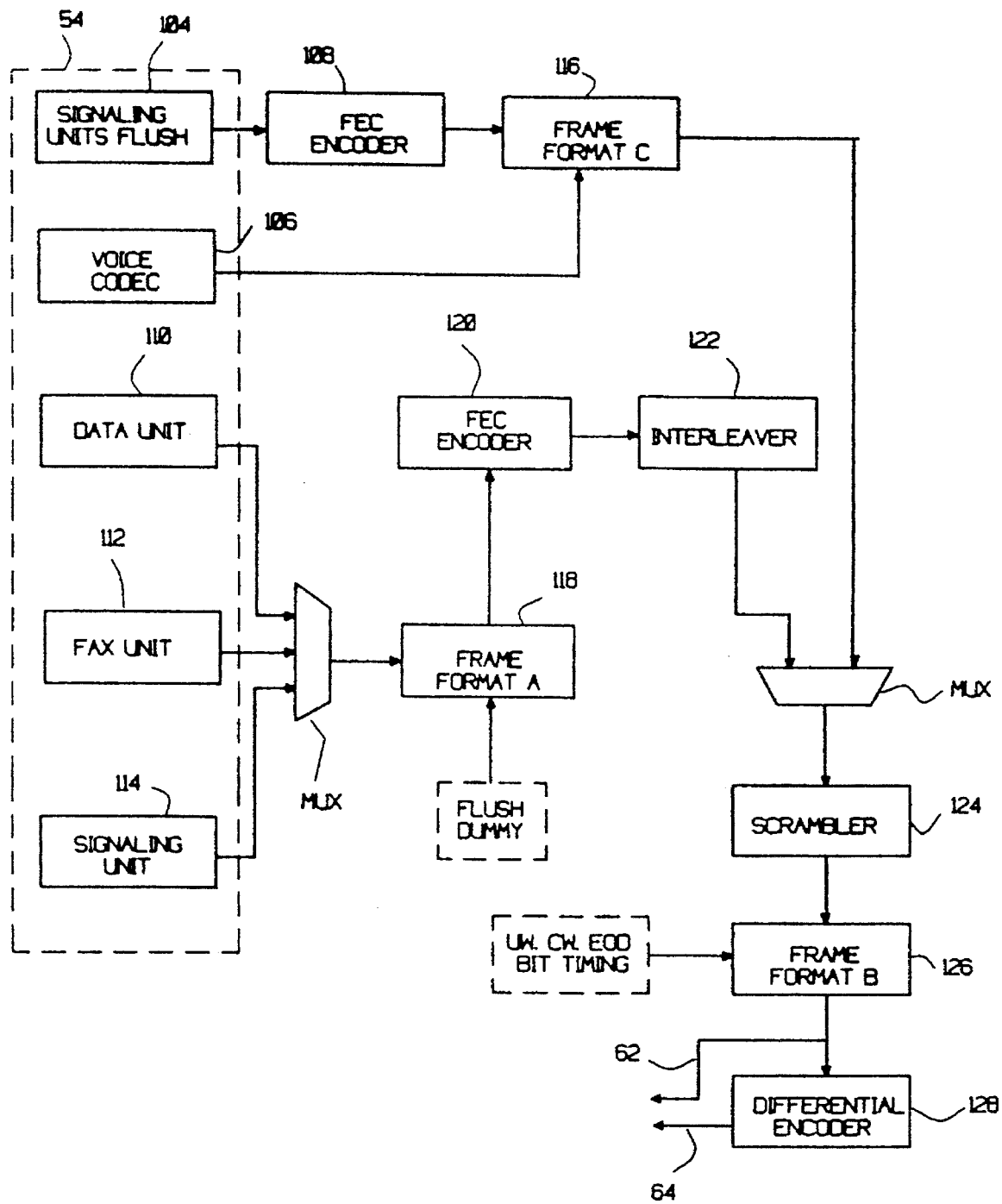
FIG. 4 is a more detailed flowchart of the voice and data encoding sequence of the satellite encoder function illustrated in FIG. 3.

The flowchart of FIG. 4 illustrates the various algorithms and their sequence of operation for performing the functions 54, 56, and 58, in creating the waveforms described in connection with FIG. 3A. The ASCII message text files 54 that are stored in the PC computer relate to both voice and data and correspond to the text files having the series of ones and zeros input to the digital portions of the transmitter of the ground station 20. The text files represented by blocks 104 and 106 of FIG. 4 are used in testing the voice capabilities of the receiver. Block 104 which responds to the voice Codec block 106 resets, as required, the forward error correction encoder represented by block 108. Block 106 is a text file that represents voice signals received by the ground station 20. The files 104 and 106 preferably include enough data to activate the receiver with information for a period of approximately ten seconds.

The ASCII text files corresponding to the input of data to the digital portion of the ground station 20 for testing the operation of the receiver are represented by block 110 which is used for testing the capability of the signals for operating a computer coupled to the mobile terminal, and by block 112 for testing the capability of the receiver for operating a fax machine. Block 114 is the text for the signalling unit in the formation of the data frame formats.

The algorithms for encoding the signalling units 108 and the frame formatting algorithm 116 respond to the text files of 104 and 106 to provide the voice activation/deactivation logic that allows the mobile terminal to turn on and off the transmitted carrier when the user is talking or silent. The voice Codec file 106 detects, and reports to the transmit framing logic 116, the presence or absence of speech energy. The voice activation logic of blocks 104 and 108 respond accordingly to the voice present indications. The frame formatting algorithms at block 116 perform the satellite frame formatting of voice signals. The algorithm for formatting the frame of data in transmitting a fax or operating a computer is represented at block 118. The framed data is then encoded by an algorithm at block 120. In encoding the data, a forward error correction (FEC) of data is used having a constraint length of 7 (K=7) of convolutional coding scheme. Depending upon the frame structure, voice, data, or signalling, the mobile terminal requires either a one-half, one-third, or three-quarters coding rate. The FEC algorithms at block 108 and 120 is performed on every bit received from the informational text file at a rate of 6750 baud. The algorithm performed at block 122 (interleave) is a process of reordering a time ordered series of bits or a packet of data in time. This algorithm is performed on every input bit at the rate of 6750 baud. A scrambler algorithm at block 124 is performed on both the voice and the data information. This algorithm performs an exclusive or (XOR) between the information bit and a scrambling security (random) key bit; and is used to provide a level of transmission security over the satellite link. It also randomizes the data to help the demodulator of the receiver perform symbol tracking. This algorithm 124 is also performed on every input bit from the information text file. A frame formatting function at block 126 utilizes unique words (UW) and unique data sequences (UW) to frame the transmitted informational data. This function also includes bit timing and end of data (EOD). The data stream is differentially encoded at block 128 to produce an (I) and (Q) output on lines 62 and 64.

Figure 10:
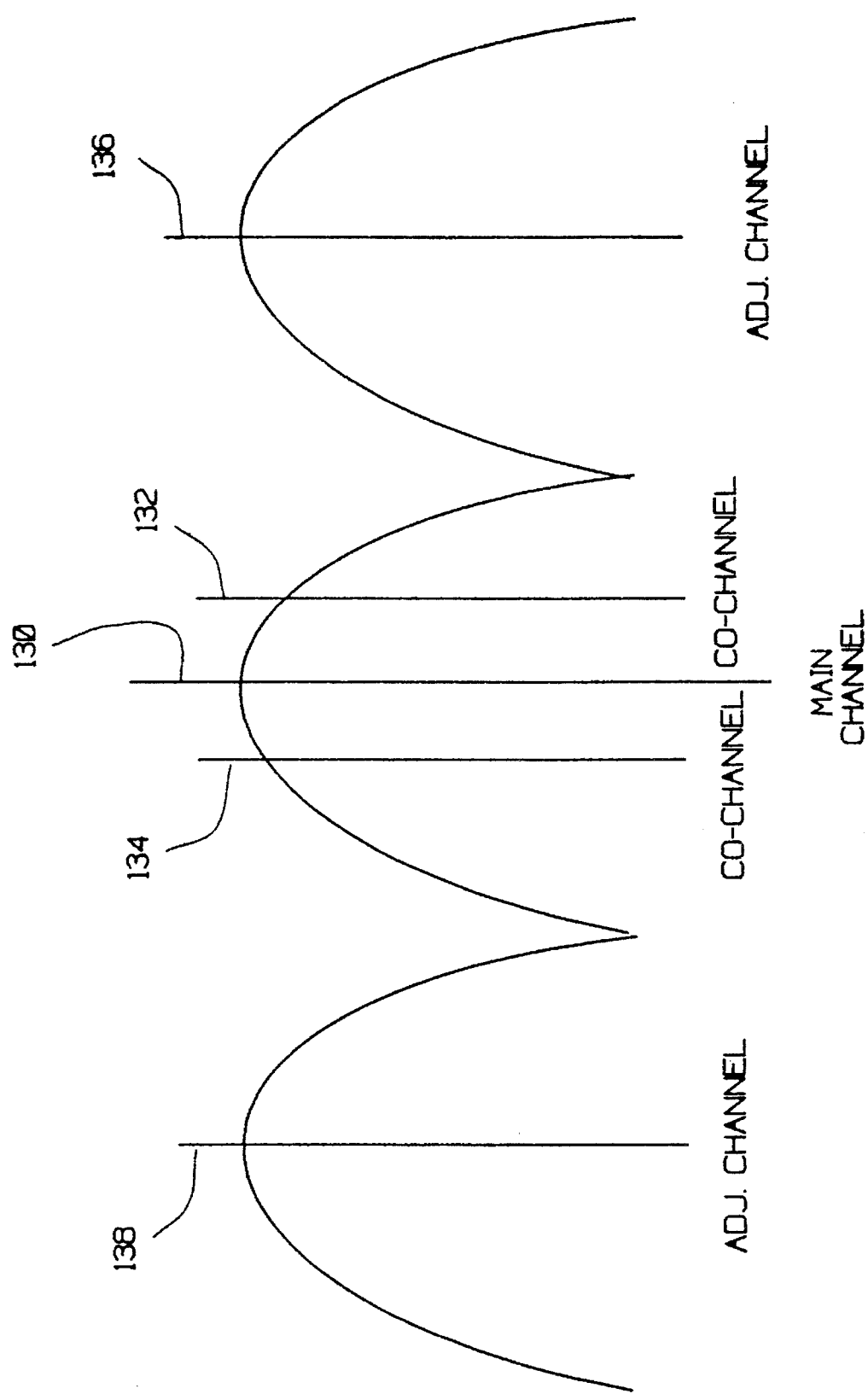
FIG. 10 is a graph schematically representing the relationship co-channel and adjacent channel interferences to the main channel in accordance with the present invention.

In accordance with the present invention, the waveform of 60% root-cosine filtered base band samples is created for the main communication channel and each of a plurality of impairments. As herein embodied and referring to FIGS. 5A and FIG. 10, the means for encoding and frame formatting the information bits previously described in connection with FIGS. 3A and FIG. 3B and FIG. 4 is provided in the computer for a main communication channel waveform represented by block 130, an upper co-channel interference waveform 132, a lower co-channel interference waveform 134, an upper adjacent channel interference waveform 136, and a lower adjacent channel interference waveform 138. Each one of the individual channels has, at its respective output (I) and (Q), a 60% root cosine filter 66. For each (I) and (Q) output of the filter are impairments 72. The outputs of the impairments are commonly connected to a summing device 78. The (I) and (Q) outputs of the filter 66 are also directly connected to the summing device bypassing the impairments 72 through switches collectively referred to at 140. The switches 140 permit the operator to selectively impair the main channel and each one of the interference channels. The digitally summed interference channels and impairments are scaled and formatted at the device 80 for input on line 86 (FIG. 2) to the input of the arbitrary waveform generator 40. Thus, two sampled base band impaired satellite signal waveform files (I) and (Q) are created, which may include interference impairment waveforms as well as channel impairments, as selected by the operator.

Figure 6:
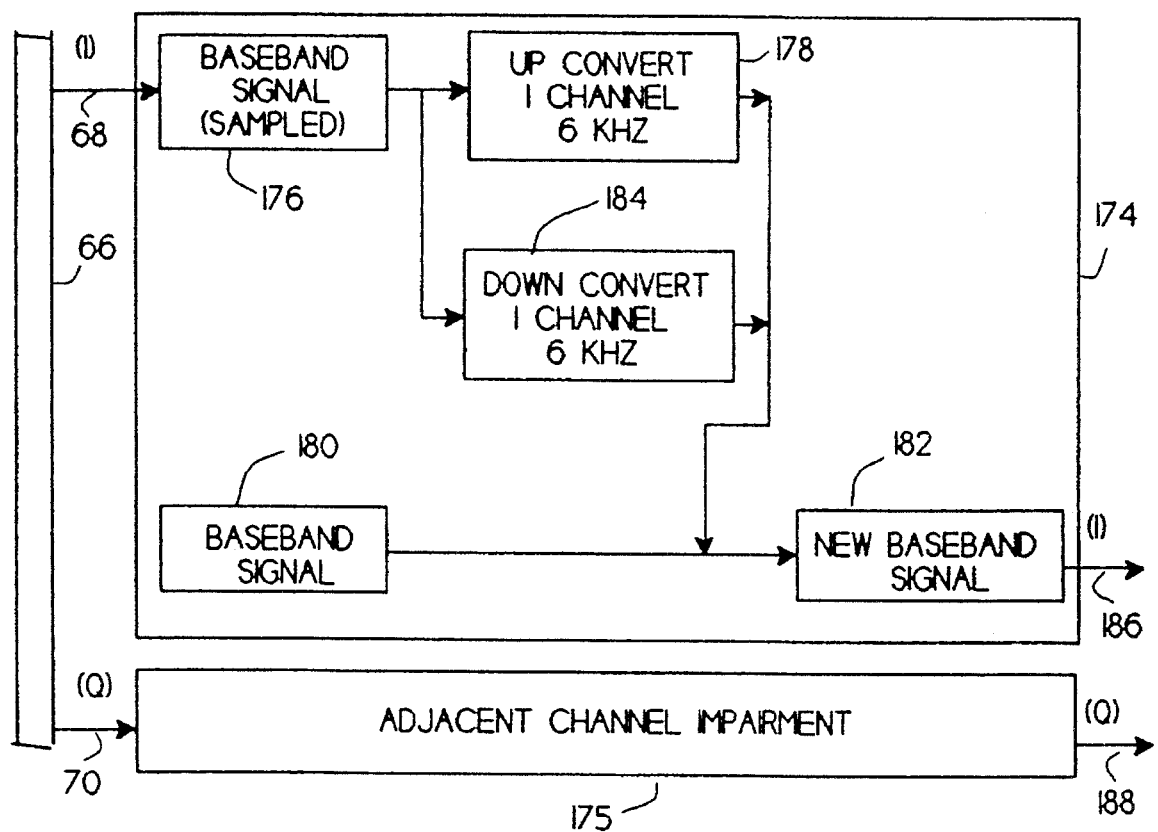
FIG. 6 is a flowchart illustrating the formation of the impairment, adjacent channel interference, in accordance with the present invention.

In selecting the upper end or lower adjacent channel interference, and/or the upper and lower co-channel, the base band samples from the root-cosine filter 66 are up and/or down converted to provide the interference at the desired frequency. Referring to FIG. 6, block 174 includes algorithms for creating the interferer for the (I) data file from the filter 66. The block 175 is similar to block 174 and includes similar algorithms for the (Q) data file from the output of the filter 66. For the sake of brevity, the individual aspects of the interferer for the (Q) data file is omitted.

Figure 5A:
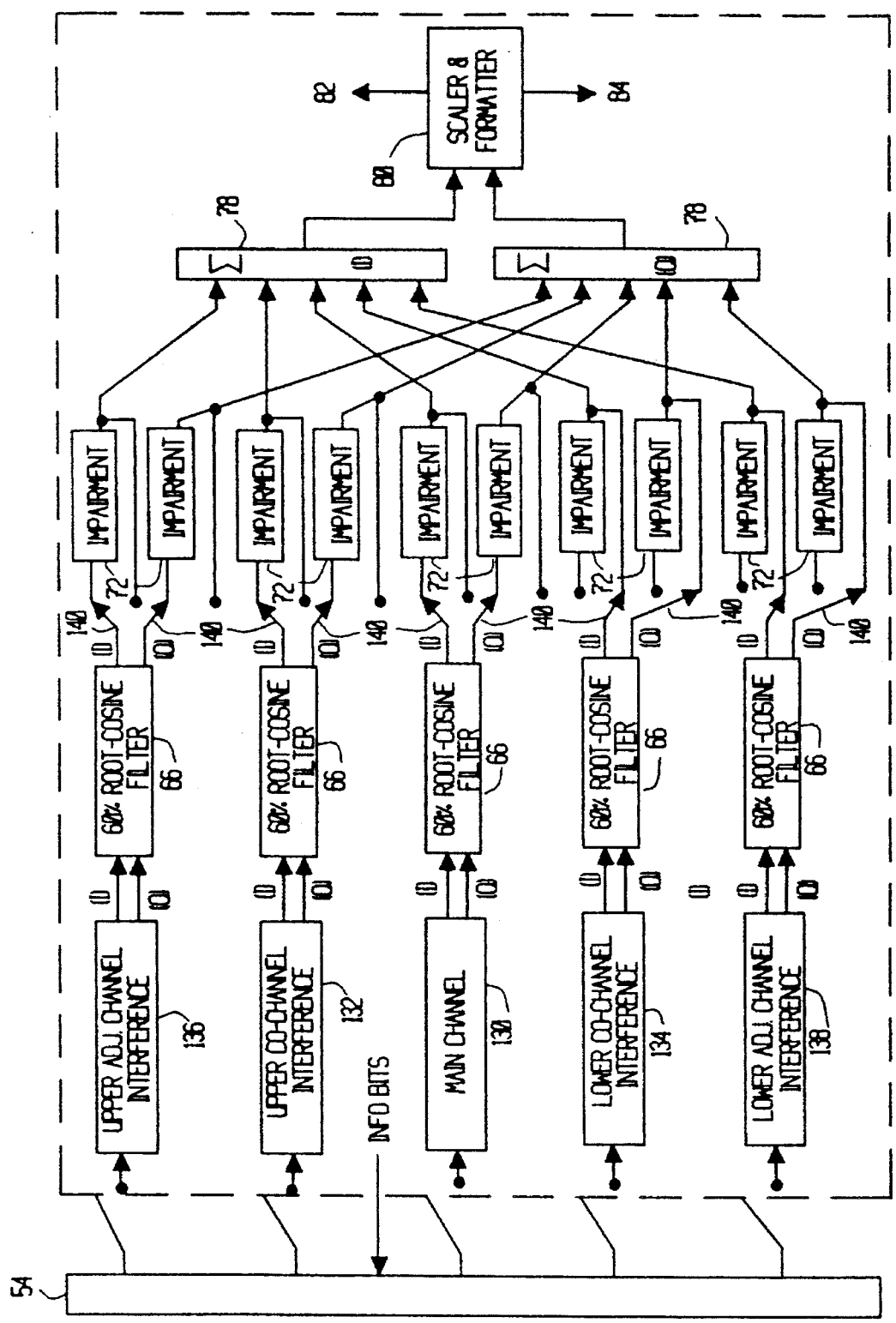
FIG. 5A is a flowchart illustrating the arrangement of the waveform creation illustrated in FIG. 3A for the various satellite channel impairments.

In FIG. 6, the sampled base band signal 176 is up converted at 178 and combined with the base band frequency offset signal 180 to produce a new base band signal at 182. For the lower adjacent channel interference, the sample base band signal 176 is down converted at 184 to provide the new base band signal represented at 182. The base band signal is mixed with a 66 kHz oscillator to create the upper adjacent channel samples. For the lower adjacent interference channel, the base band signal is mixed with a 6 kHz oscillator. The co-channel interferers shown in FIG. 5A are similar to the adjacent channel interferers, except that for the upper co-channel, mixed with the base band and the base band is mixed with a 3 kHz oscillator and for a lower co-channel interference a −3 kHz are mixed with the base band channel. A new base band signal 182 for the (I) data file is output at line 186 and the new base band signal output for the (Q) data file is output at line 188.

Figure 7:
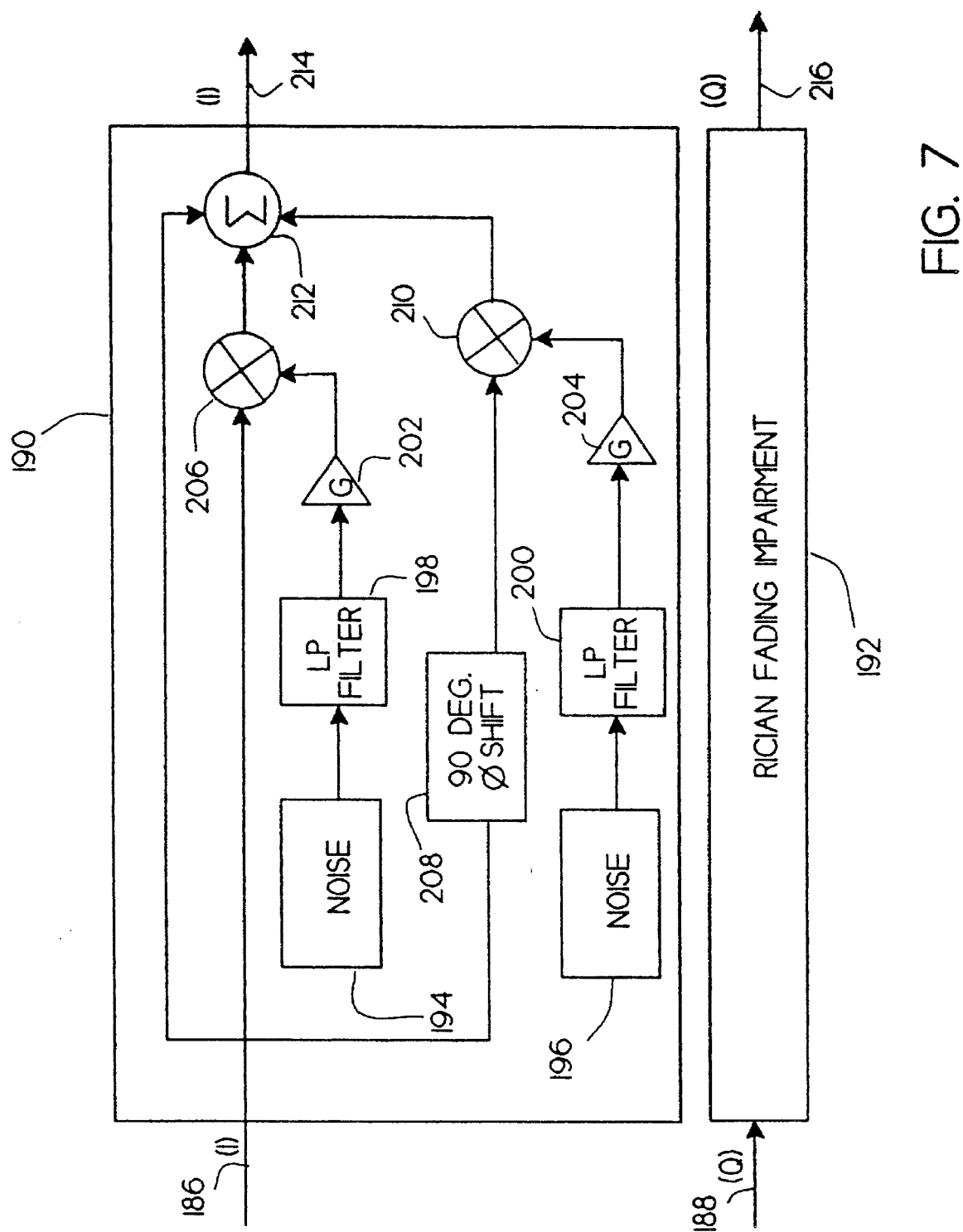
FIG. 7 is a flow diagram illustrating the formation of the impairment, Rician Fading, in accordance with the present invention.

Referring to FIG. 7, block 190 is the algorithm for Rician fading impairment for the (I) data file; and block 192 represents the Rician Fading impairment for the (Q) data file. The impairment 190 has an input connected to the output 186 of the adjacent channel impairment. Block 192 has an input 188 connected to the adjacent channel impairment for the (Q) data file. For the Rician Fading impairment, uncorrelated gaussian noise is generated at 194 and 196. The generated noise from source 194 is filtered at a low pass finite impulse response filter 198. The noise from 196 is filtered by a low pass finite impulse response filter 200. The signal at the output of the low pass filter 198 is amplified by an amplifier 202 and the output of the low pass filter 200 is amplified by amplifier 204. The signal on output 186 is multiplied by the generated noise at 206 and the generated noise from 196 is multiplied by the signal on 186 which is shifted in phase at 208 by multiplier 210. The output of the multipliers 206 and 210 are summed with the output on line 186 at device 212. A similar algorithm is provided for mixing the Rician fading impairment with the signal from the (Q) data file at block 192. The signal that is impaired by Rician Fading is output for the (I) data file at 214 and the signal subjected to Rician Fading for the (Q) data file is output at 216. The filters 198 and 200 are preferably of the type referred to as a second order Butterworth.

Figure 8:
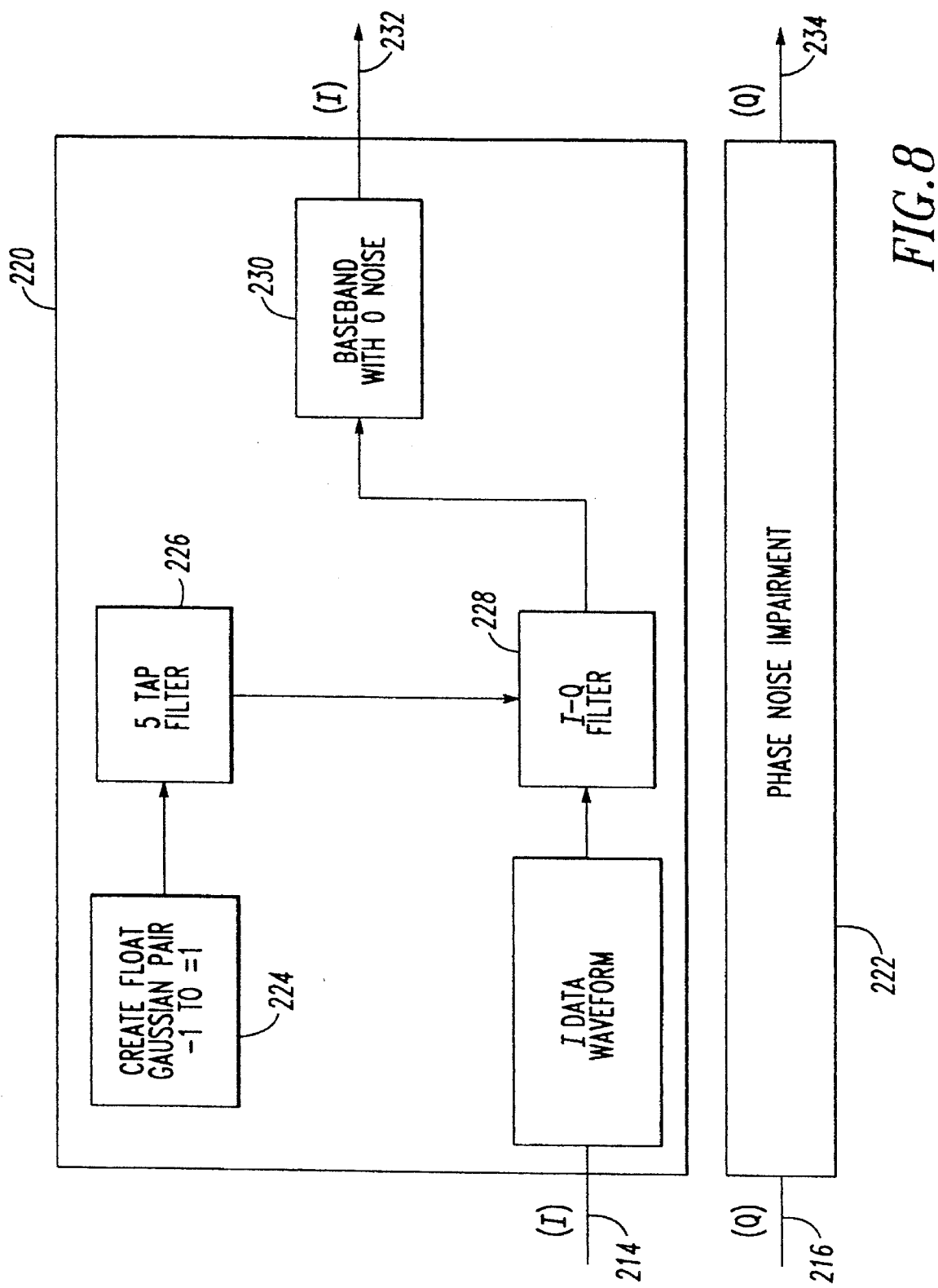
FIG. 8 is a flowchart illustrating the formation of the impairment, phase noise, in accordance with the present invention.

Referring to FIG. 8, an algorithm for creating phase noise is illustrated by block 220 for the (I) data file and by block 222 for the (Q) data file. The Phase Noise impairment algorithm 220 has as an input the (I) data file 214 of the signal samples that are subjected to the Rician Fading impairment; and the phase noise impairment 222 has as its input the (Q) data file 216 of the signal having the Rician Fading impairment. The phase noise impairment is a gaussian digital noise file at block 224. This is a gaussian pair with a floating number between −1 and +1. A digital noise file at 224 is then filtered at 226 and a filter 228 to obtain the desired phase noise mask. The data waveform from line 214 is then filtered at 228 to provide an output corresponding to a base band with phase noise at 230. The base band is then used as the modulation source in place of the tertiary frequency. The output on line 232 for the (I) file and the output on line 234 for the (Q) file outputs a signal in accordance with the following expression.

$$\text{newsign} = \text{oldsign} \cdot e^{j2 \cdot 1/4 \frac{\widehat{\text{FREQ}}}{\text{SAMPLE RATE}} \cdot \widehat{d}\text{noise}}$$

Figure 9:
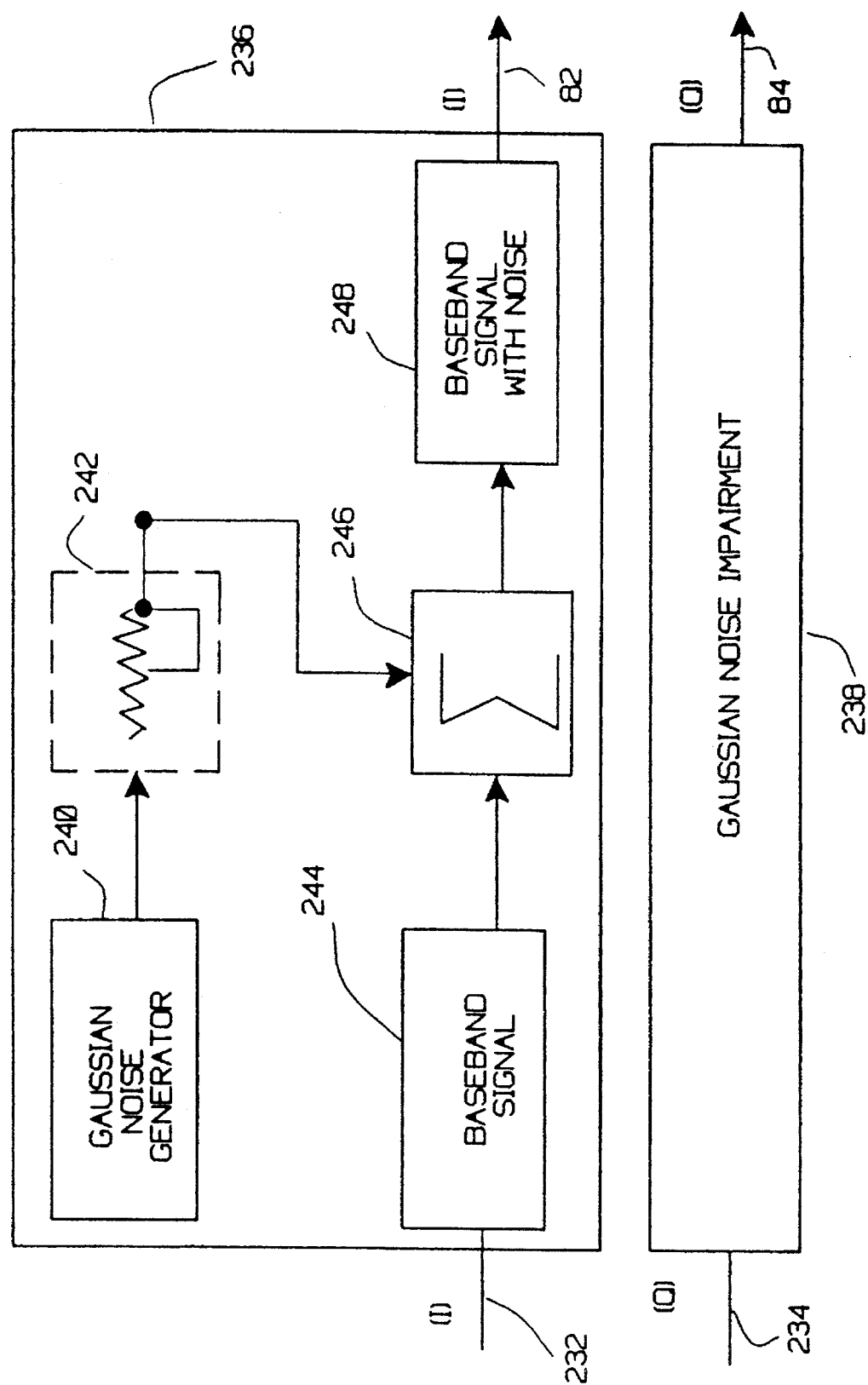
FIG. 9 is a flowchart illustrating the formation of the impairment, gaussian noise, in accordance with the present invention.

Referring to FIG. 9, the gaussian noise impairment for the (I) data file is represented at block 236; and the gaussian noise impairment for the (Q) data file is represented at block 238. The gaussian noise is created by using a random number generator 240, which is then scaled at by a potentiometer 242. The gaussian noise generator 240 together with the base band signal 244 creates two uncorrelated signal sources that are summed at 246. The summed base band signal, which may have one or more of the impairments previously described is summed at 246 to provide the base band signal with the gaussian noise impairment at 248. Thus, the base band signal for the (I) data file with the selected impairments is output on line 82 (see FIG. 3); and the output signal with the gaussian noise and selected impairments is output on line 84 for the (Q) data file. The impairments that include the interferers as well as the various channel impairments that include Rician Fading, phase noise, and gaussian noise may be applied to the test signal selectively and in any combination desired by the operator for example, the main channel may be subjected to one or more of the various impairments. The interference channel may be subjected to one or more of the impairments; and the signal applied to the receiver may include one or more of the interference impairment channels.

Figure 5B:
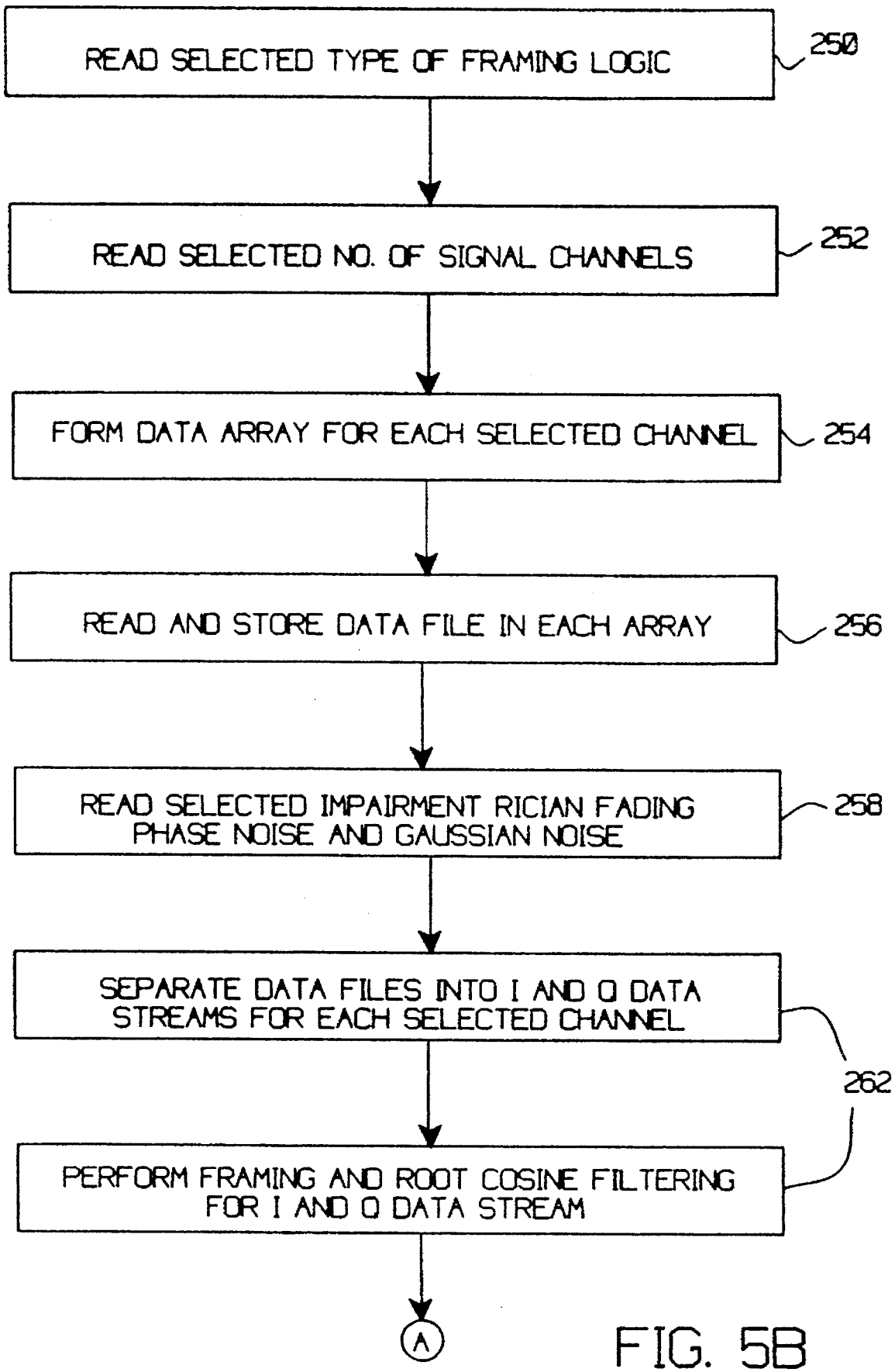
FIG. 5B and 5C are flowcharts illustrating the process of creating the selected waveform with selected impairments.
Figure 5C:
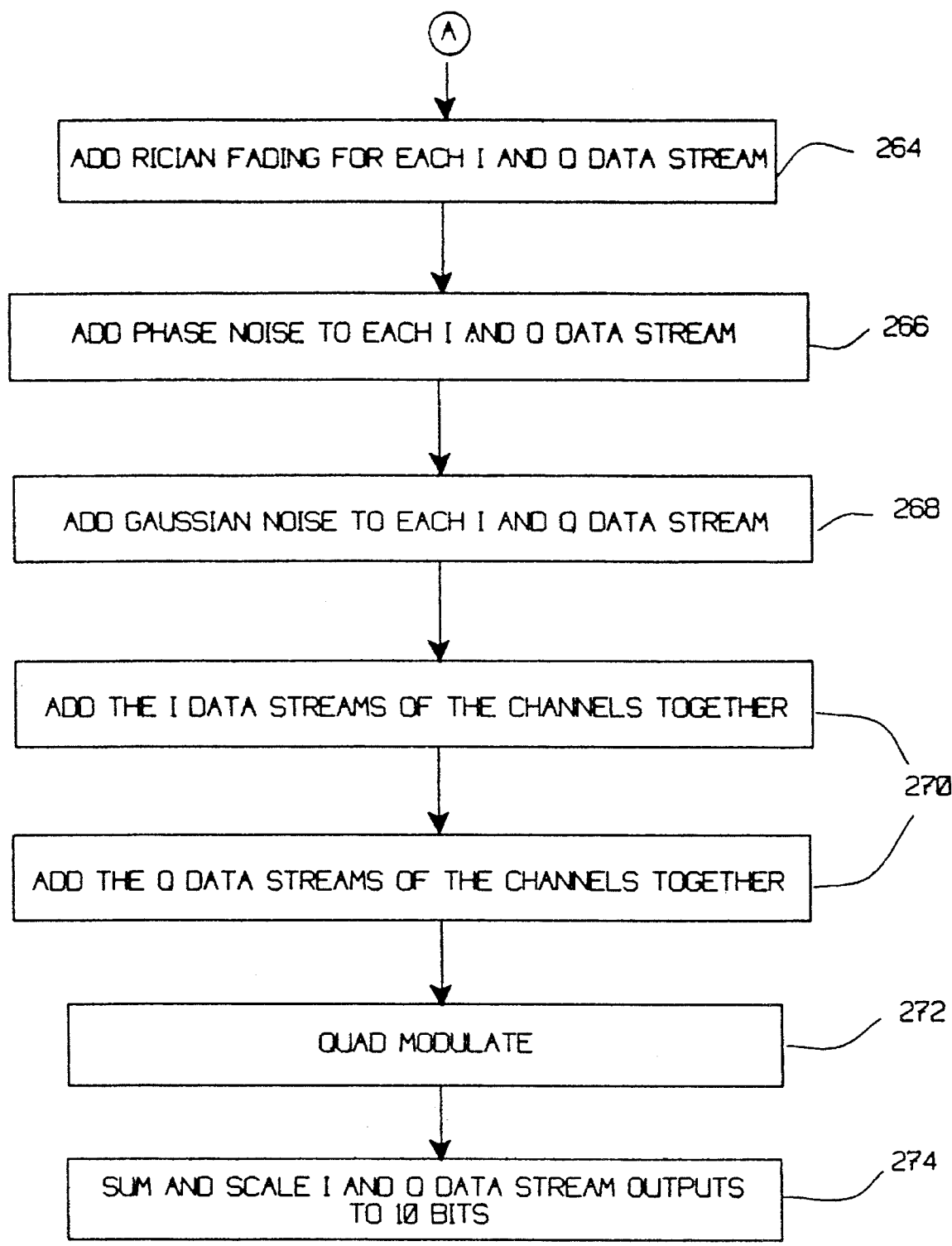

The steps in the process of creating the impaired waveform is described with reference to FIGS. 5B and 5C. The type of framing logic desired for testing the receiver is read in and selected at step 250. This selection may be voice logic, data logic, or signalling units, for example. Then, the signal channels are selected and read at step 252. This selection may include one or more of the main channels, upper and lower co-channels, and upper and lower adjacent channels. If all channels are selected, there is a total of five according to the present embodiment. A data memory array is then allocated for each of the selected channels at step 254. The information text of data file 54 (see FIG. 5A) is then read and stored in each of the allocated arrays for the selected channels at step 256. The desired types of impairment are selected and read at step 258. At this step, if desired none of the impairments need to be added to selected channels, or one or more may be added as desired. The output for the created waveform is an output for application to the arbitrary wave generator 40.

At this stage in the process, the step of framing and root-cosine filtering the data memory array for each of the selected runs of the five channels is performed at step 262. At the output of the root co-signed filtering step, the selected channels are divided into separate (I) and (Q) data files. As previously mentioned, the impairments may be selectively added to the selected channels as desired. It is assumed that all of the impairments are selected in the following description.

After filtering each of the selected channels, the Rician fading is added to the (I) data file and the (Q) data file at step 264 for each of the selected channels. Then, the phase noise impairment is added to the (I) and (Q) data files of the selected channels at step 266. Following this step, gaussian noise is added to the (I) and (Q) data files of the selected channels at step 268. The impaired signals from all of the selected channels are then added together to provide a single output for the (I) data files of the selected channels and a single output for the (Q) data files of the selected channels at step 270. The single data file output for each of the (I) and (Q) data files is then scaled to 12 bits at step 272.

Figure 11:
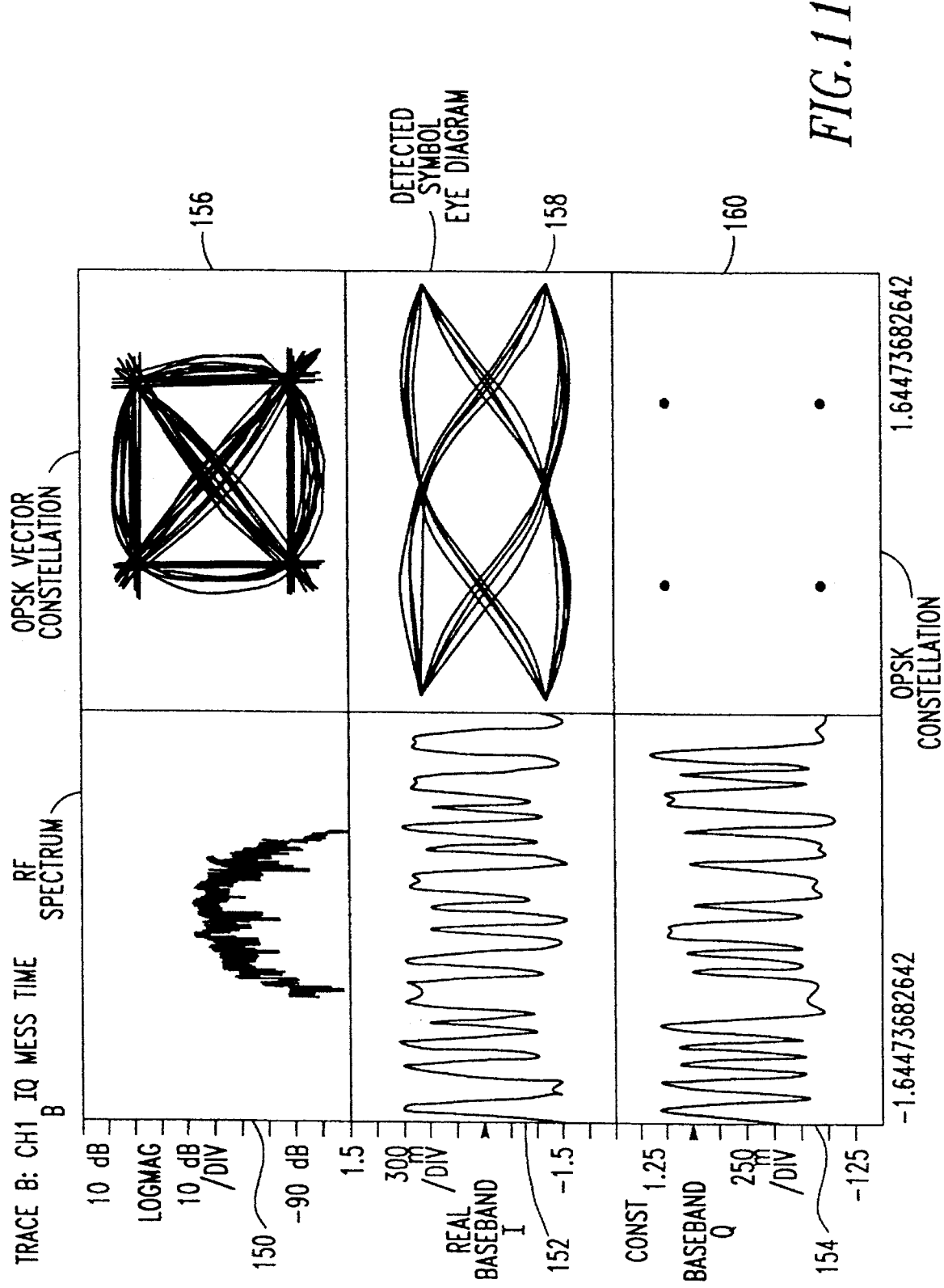
FIG. 11 is a graphical representation of the demodulated calibrated RF satellite signal generator with no impairments.
Figure 12:
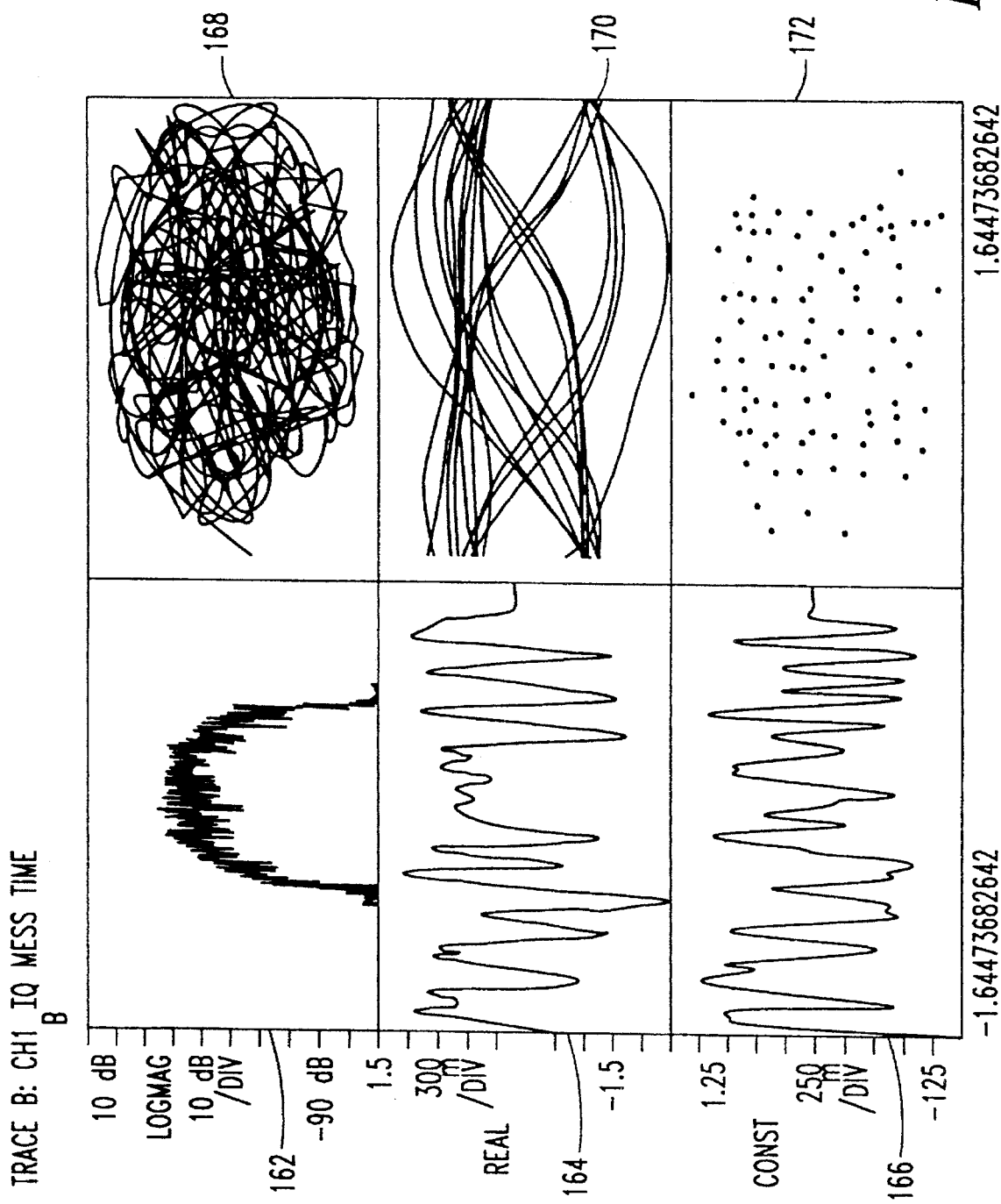
FIG. 12 is a graphical representation of a demodulated calibrated RF satellite signal generator with impairments.

FIGS. 11 and 12, illustrate the various types of waveforms which appear on the display of the vector analyzer 48. FIG. 11 illustrates an RF spectrum waveform 150, a base band in-phase waveform 152, a base band (Q) waveform 154, and a (QPSK) vector constellation diagram 156 and a detected symbol (I) diagram 158, and finally a (QPSK) constellation 160. The diagrams of FIG. 11 illustrate the analog waveforms of the RF spectrum and the base band (I) and (Q) waveforms without impairments. Waveforms 156, 158, and 160 illustrate the demodulated waveforms of the receiver without impairments. FIG. 12 illustrates the waveforms of FIG. 11 with impairments. Waveform 162 is the RF spectrum. Waveform 164 is the base band (I) waveform, and waveform 166 is the base band (Q) waveform. Waveform 168 is the vector constellation with impairments including the gaussian noise where $E_b/N_o=7$. Waveform 170 is an (I) diagram of the detected symbols and the diagram 172 is a (QPSK) constellation of the demodulated output with impairments.

The mobile terminal receiver performance is measured in terms of dynamic range and sensitivity, in and out of the band signal rejection, adjacent and co-channel signal interference, Doppler tracking and bit error rate (BER) testing using satellite channel impairments of gaussian noise and Rician fading. While the vector modulator 44 provides the required RF signal integrity (spurious suppression, amplitude stability, frequency accuracy, etc.), signal impairment characteristics are established at the time of waveform creation in the PC computer. Channel noise, fading and additional interference, impairments such as the co-channel and adjacent channel, are added to the original satellite signal analytically. For gaussian noise, the user is required to specify the required $E_b/N_0$ (signal energy per bit/noise in a 1-Hz bandwidth) and for Rician Fading the fading bandwidths and K-factor. Symbol degradation due to added noise is visible in FIG. 12 as previously described. Note the large fuzziness introduced onto both the (QPSK) vector constellation and the detected (I) diagram.

In summary, the PC computer based waveform creation software is used to generate intermediate outputs in the (DQPSK) modulation chain. Specifically, the PC software generates the root-cosined filtered (I) and (Q) base band digitally sampled waveform files. Using external hardware and test equipment, the PC generated digitally sampled (I) and (Q) waveforms are subsequently frequency translated and summed to complete the (DQPSK) modulation chain.

It will be apparent to those skilled in the art that various modifications and variations can be made in the apparatus and method of the present invention without departure from the spurious scope of the invention. Thus, it is intended that the present invention cover the modifications and variations of this invention provide they come within the scope of the appended claims and their equivalents.

I claim:

1. An apparatus for verifying performance of an RF receiver, comprising:

arbitrary waveform generator means for outputting an analog in-phase waveform and an analog quadrature waveform in in accordance with sampled digital waveform data, said arbitrary waveform generator means including parallel first and second first in, first out random access memories for storing the sampled digital waveform data, the sampled digital waveform data comprising an in-phase waveform file stored in said first in first out memory and a quadrature waveform file stored in said second first in first out memory, each of the in-phase and quadrature waveform files including 60% root-cosine differential quadrature phase shift keyed data corresponding to successive frames of primary transmission channel data, co-channel interference data, adjacent channel interference data, and data relating to at least one of a plurality of impairments;

unity gain reconstruction filter means, connected to said arbitrary waveform generator means, for smoothing the analog in-phase and quadrature waveforms;

vector signal generator means, responsive to the filtered analog in-phase and quadrature waveforms, for outputting a modulated RF signal; and means for coupling an input of the RF receiver to the modulated RF signal output from said vector signal generator.

2. A method of verifying the performance of a satellite digital receiver comprising the steps of:

generating an information file stream of ones and zeroes representing digital information, the digital information being a type input to a digital portion of a ground segment for processing and transmission to a mobile transceiver via a satellite;

transforming the information file stream into a satellite signal format of encoded framed data;

separating the encoded framed data into in-phase and quadrature data streams which are root-cosine filtered to produce sampled in-phase and quadrature data streams;

summing digitally calibrated simulated channel impairments and the sampled in-phase and quadrature data streams to provide respective summed in-phase and quadrature data streams;

scaling the summed in-phase and quadrature data streams from a floating point representation to a fixed point representation;

downloading the fixed point in-phase and quadrature data streams into two parallel real time first in/first out memories of an arbitrary waveform generator to produce analog in-phase and quadrature waveforms in accordance with the downloaded fixed point in-phase and quadrature data streams;

combining the analog in-phase and quadrature waveforms in a vector modulator to produce an RF digital quadrature phase shift keyed signal output;

applying the RF digital quadrature phase shift keyed signal to an analog subsection of the satellite digital receiver;

actuating the satellite digital receiver to produce an output; and monitoring the satellite digital receiver output.

3. The apparatus of claim 1, wherein the data relating to the at least one of the plurality of impairments comprises gaussian noise.

4. The apparatus of claim 1, wherein the data relating to the at least one of the plurality of impairments comprises Rician fading.

5. The apparatus of claim 1, wherein the data relating to the at least one of the plurality of impairments comprise phase noise.

6. The method of claim 2, wherein said step of summing comprises:

simulating gaussian noise channel impairments; and summing the simulated gaussian noise channel impairments and the sampled in-phase and quadrature data streams to provide the respective summed in phase and quadrature data streams.

7. The method of claim 2, wherein said step of summing comprises:

simulating Rician-fading channel impairments; and summing the simulated Rician fading channel impairments and the sampled in-phase and quadrature data streams to provide the respective summed in-phase and quadrature data streams.

8. The method of claim 1, wherein said step of summing comprises:

simulating phase noise channel impairments; and summing the simulated phase noise channel impairments and the sampled in-phase and quadrature data streams to provide the respective summed in-phase and quadrature data streams.

9. The apparatus of claim 1, wherein the in-phase and quadrature waveform files corresponding to the primary transmission channel data comprises data representing a base band offset frequency.

10. The apparatus of claim 1, wherein the in-phase and quadrature waveform files corresponding to the adjacent channel interference data comprises data corresponding to a frequency resulting from mixing a base band signal with a 6 kHz oscillator signal.

11. The apparatus of claim 1, wherein the in-phase and quadrature waveform files corresponding to the co-channel interference data comprises data corresponding to a frequency resulting from mixing a base band signal with a 3 kHz oscillator signal.

12. The method of claim 2, wherein said step of summing comprises:

mixing a base band frequency signal with a 6 kHz oscillator signal to create an adjacent channel interference channel impairment; and summing the adjacent channel interference channel impairment with the sampled in-phase and quadrature data streams to provide the respective summed in-phase and quadrature data streams.

13. The method of claim 2, wherein said step of summing comprises:

mixing a base band signal with a 3 kHz oscillator signal to create a co-channel interference channel impairment; and summing the co-channel interference channel impairment with the sampled in-phase and quadrature data streams to provide the respective summed in-phase and quadrature data streams.

14. The apparatus of claim 3, comprising:

random number generator means for generating gaussian noise; and summing means for summing a base band signal with the gaussian noise output from said random number generator means to provide the impairment data corresponding to a base band signal with gaussian noise.

15. The method of claim 6, wherein said step of simulating gaussian noise channel impairments comprises:

generating random number signals; and mixing the random number signals with a base band signal to provide the simulated gaussian noise channel impairments.

16. The apparatus of claim 4, further comprising:

means for generating uncorrelated gaussian noise from a plurality of sources;

means for filtering and amplifying the uncorrelated gaussian noise;

means for multiplying the filtered and amplified noise from one of said plurality of sources by a base band signal;

means for multiplying the filtered and amplified noise from another of said plurality of sources by the base band signal shifted in phase by 90 degrees; and means for summing the multiplied signals to provide the impairment data corresponding to the Rician fading.

17. The method of claim 7, wherein said step of simulating Rician fading channel impairments comprises:

generating uncorrelated gaussian noise from a plurality of sources;

filtering and amplifying the uncorrelated gaussian noise;

multiplying the amplified gaussian noise from one of the plurality of sources by a base band signal;

multiplying the amplified gaussian noise from another of the plurality of sources by the base band signal shifted 90 degrees in phase; and summing the multiplied signals to provide the simulated Rician fading channel impairments.

18. The apparatus of claim 5, further comprising:

means for creating gaussian pair data with a floating number between −1 and +1;

means for filtering the gaussian pair data to obtain a phase noise mask; and means for filtering a base band signal and the phase noise mask to provide the impairment data corresponding to a base band signal with phase noise.

19. The method of claim 8, wherein said step of simulating phase noise channel impairments comprises:

creating a gaussian pair with a floating number between −1 and +1;

filtering the gaussian pair to obtain a phase noise mask; and filtering a base band signal with the phase noise mask to obtain the simulated phase noise channel impairments.

20. An apparatus for verifying performance of an RF receiver comprising:

waveform data generating means for generating waveform samples which emulate framed, encoded satellite signals including satellite channel impairments;

waveform generating means, coupled to said waveform data generating means, for converting the waveform samples into analog waveforms;

filter means, coupled to said waveform generating means, for smoothing the analog waveforms;

modulation means, coupled to said filter means, for outputting a phase modulated RF signal in accordance with the smoothed analog waveforms; and coupling means for coupling the modulated RF signal to an input of the RF receiver.

21. The apparatus for verifying performance of an RF receiver of claim 20, wherein said waveform generating means comprises:

memory means for storing the waveform samples; and digital/analog conversion means, coupled to said memory means, for converting the stored waveform samples into the analog waveforms.

22. The apparatus for verifying performance of an RF receiver of claim 21, wherein said memory means comprises first and second first-in, first-out memories.

23. The apparatus for verifying performance of an RF receiver of claim 20, wherein the waveform samples generated by said waveform data generating means are a digital representation of a 60% root cosine filtered differential phase shift keyed waveform.

24. The apparatus for verifying performance of an RF receiver of claim 20, wherein the satellite channel impairments comprise Rician fading.

25. The apparatus for verifying performance of an RF receiver of claim 20, wherein the satellite channel impairments comprise gaussian noise.

26. The apparatus for verifying performance of an RF receiver of claim 20, wherein the satellite channel impairments comprise phase noise.

27. The apparatus for verifying performance of an RF receiver of claim 20, wherein the satellite channel impairments comprise adjacent channel interference.

28. The apparatus for verifying performance of an RF receiver of claim 20, wherein the satellite channel impairments comprise co-channel interference.

29. The apparatus for verifying performance of an RF receiver of claim 20, wherein said modulation means comprises vector modulation means for outputting a stable calibrated phase modulated RF signal at a desired amplitude and frequency as the phase modulated RF signal.

30. A method of verifying performance of an RF receiver comprising the steps of:

(a) generating waveform samples which emulate framed, encoded satellite signals including satellite channel impairments;

(b) converting the waveform samples into analog waveforms;

(c) filtering the analog waveforms to provide smoothed analog waveforms;

(d) phase modulating the smoothed analog waveforms to provide a phase-modulated RF signal; and (e) coupling the phase-modulated RF signal to an input of the RF receiver.

* * * * *